Sept. 27, 1960

H. J. LAWRENCE 2,954,006

FERROMAGNETIC PRINTING METHOD AND APPARATUS

Filed July 31, 1957

Inventor
Harold J. Lawrence
By Ira Milton Jones
Attorney

United States Patent Office 2,954,006

Patented Sept. 27, 1960

2,954,006

FERROMAGNETIC PRINTING METHOD AND APPARATUS

Harold J. Lawrence, Waukesha, Wis., assignor to Columbian Art Works, Milwaukee, Wis., a corporation of Wisconsin Filed July 31, 1957, Ser. No. 675,387

3 Claims. (Cl. 118—637)

Figure 1:
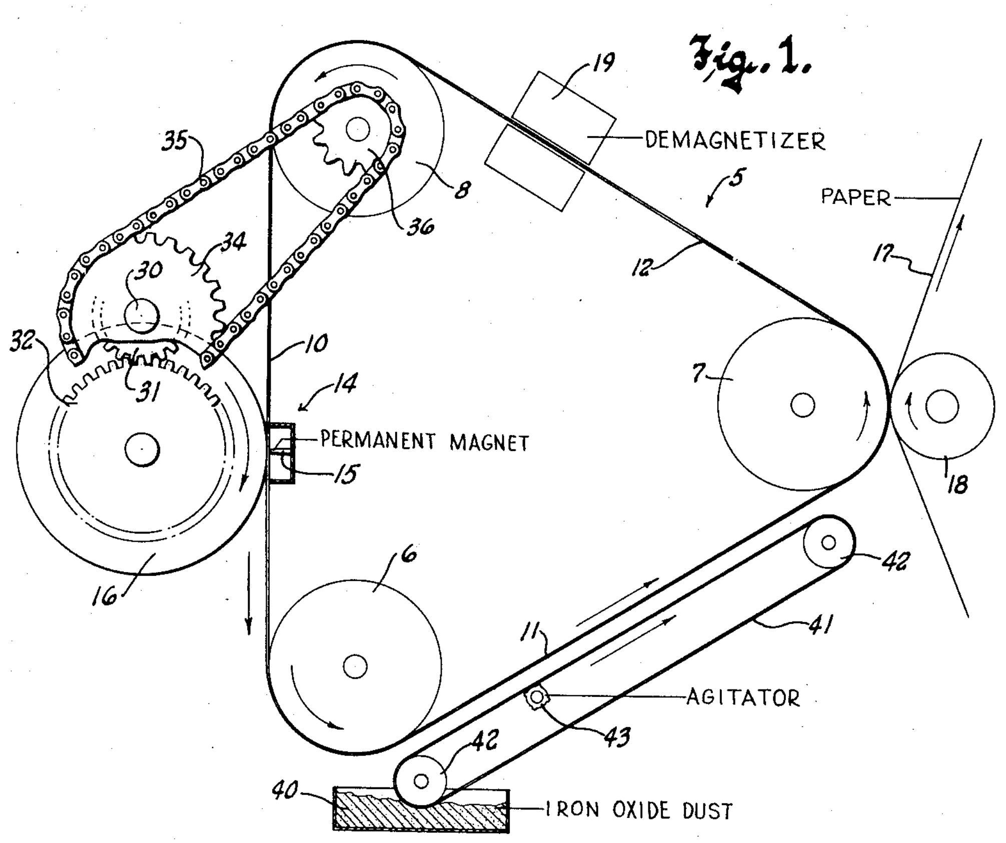

This invention relates to printing apparatus of the type employing flexible permanently magnetizable tape having areas thereof magnetized in patterns conforming to the configurations of characters to be imprinted, and wherein the tape carries finely divided particles of magnetic material on its magnetized areas, which particles produce impressions when the tape is brought into flatwise engagement with paper or other material to be imprinted.

In one form of such ferromagnetic printing apparatus the characters to be imprinted are delineated in relief on the cylindrical surface of a character bearing roller, and the tape—which may be ordinary magnetic recording tape—is passed through an air gap between said surface of the roller and an adjacent magnet, to thus cause areas of the tape to be magnetized in patterns which conform to the shapes delineated on the roller. The tape is thereafter passed through a zone in which it is dusted or sprayed with finely divided particles of magnetic material in air or liquid suspension. The magnetic particles adhere only to the magnetized areas of the tape, and are carried by the tape into engagement with the paper or other surface to be imprinted. The paper may be moistened or may have its surface coated with gelatin or the like to cause the magnetic particles to adhere to it and be separated from the tape, or the tape with the ferromagnetic particles adhering thereto may be inked, the particles providing an ink retaining surface where they are present on the tape.

Printing apparatus of the type here under consideration finds utility in high speed computing machines and similar apparatus, but it is also useful in the graphic arts for the printing of calendar pads, consecutively numbered tickets and similar items wherein each successive imprinted article requires a different one of a series of characters to be imprinted thereon.

The utility of such apparatus in the printing of calendar pads will be apparent from the fact that it enables the individual sheets of each pad to be printed in succession, so that each complete pad can be assembled substantially simultaneously with the printing of the sheets that compose it. An important reason why such printing apparatus has not come into extensive use in the graphic arts may be seen from the fact that the sheets of a small day-by-day desk calendar pad, if laid end-to-end, would extend for about 90 feet, and therefore theoretical considerations would seem to require a character bearing roller having a circumference of about 90 feet for the printing of such a calendar pad. Obviously a roller of such size would not be feasible from a mechanical standpoint, and the advantages of printing calendar pads and the like by means of ferromagnetic apparatus would be lost if such an unwieldly character bearing roller were needed.

It is therefore an object of this invention to provide apparatus for printing on paper or other surfaces by means of a flexible permanently magnetizable tape or the like, wherein the characters to be imprinted are delineated in relief on the cylindrical surface of a character bearing roller which imparts localized magnetization patterns to the tape, and wherein said character bearing roller may be very small and compact, despite the fact that it has a large number of characters delineated thereon.

Another object of this invention resides in the provision of apparatus of the character described wherein the characters delineated on the cylindrical surface of the character bearing roller may be very substantially foreshortened circumferentially, to enable the roller to be very compact, but wherein the impressions of the characters that are made on the paper or other surface to be imprinted nevertheless have their normal configurations.

Still another object of this invention resides in the provision of means in the printing apparatus just described whereby the magnetized areas of the tape that are produced by the circumferentially foreshortened characters delineated on the cylindrical surface of a character bearing roller are attenuated in the direction of such foreshortening, so that said magnetized areas have the normal shapes of such characters, and so that by said means the foreshortening of the characters delineated on the roller is compensated for.

With these and other objects in view which will appear as the description proceeds, this invention resides in the novel construction, combination and arrangement of parts of the apparatus substantially as hereinafter set forth and more particularly defined in the appended claims, it being understood that such changes in the precise embodiment of the hereindisclosed invention may be made as come within the scope of the claims.

Figure 2:
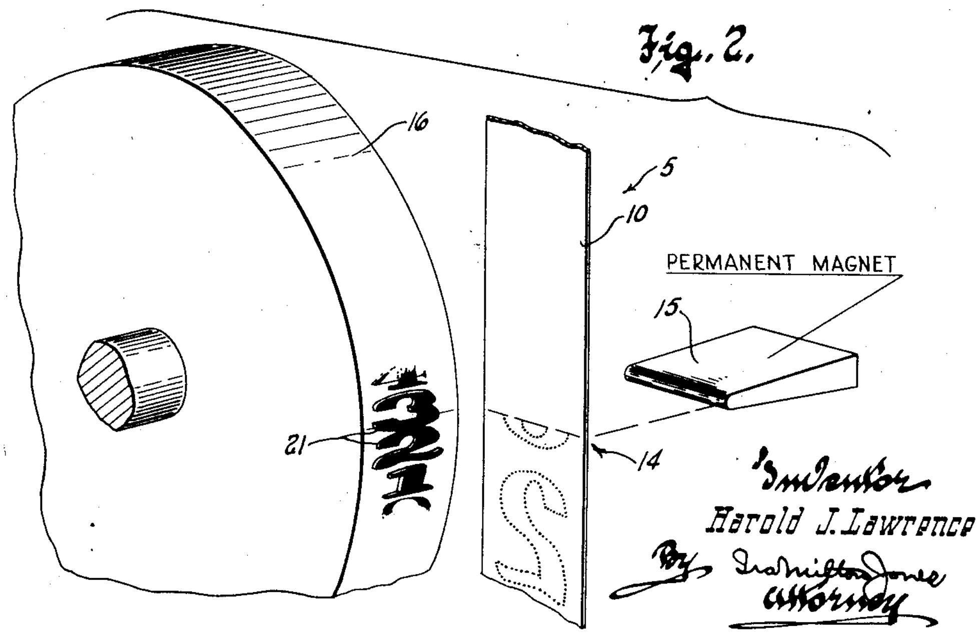

The accompanying drawing illustrates one complete example of the physical embodiment of the invention constructed according to the best mode so far devised for the practical application of the principles thereof, and in which:

Figure 1 is a more or less diagrammatic view of an apparatus embodying the principles of this invention; and Figure 2 is a fragmentary group perspective view of the components of the apparatus which define its magnetizing zone.

Referring now to the accompanying drawing, the numeral 5 designates generally an endless permanently magnetizable tape trained around three tape supporting rollers 6, 7 and 8, which define a fixed orbit for the tape around which it moves lengthwise at a uniform rate. The tape may be the conventional acetate base sound recording tape or may be a flexible steel band having smooth surfaces, but in either case its width must be at least equal to the width of the widest character to be imprinted by means of the device.

The three tape supporting rollers define three substantially straight stretches 10, 11, 12 of the tape. The stretch 10 includes a magnetizing zone 14 in which a permanent magnet 15 and a character bearing roller 16 cooperate to effect magnetization of areas of the tape, which areas have the shape of characters to be imprinted on a web 17 of paper or other surface.

In the stretch 11 the tape is dusted or sprayed with finely divided particles of magnetic material, such as iron oxide dust, which clings only to the magnetized areas of the tape. One of the tape supporting rollers 7 may cooperate with a paper supporting roller 18 to define a printing zone toward which the tape moves from the dusting zone with the iron oxide dust adhering to its magnetized areas and in which the tape is brought into flatwise engagement with the web of paper to be imprinted. After traversing the printing zone the tape moves into the third stretch 12 in which it may be demagnetized by means of a demagnetizing head 19 of a type well known to those skilled in the art; and after demagnetization it may be repassed through the magnetizing zone and thus re-used indefinitely. At least one of the three tape supporting rollers, designated by 8, is rotatably driven, as hereinafter described, to actuate the tape in such lengthwise orbital motion.

The character bearing roller 16 is made of magnetically permeable material and is mounted for rotation on a fixed axis at a rate synchronized with lengthwise travel of the tape. The characters 21 to be imprinted are delineated in relief on the cylindrical surface of the character bearing roller and are greatly fore-shortened in the circumferential direction of the roller. The characters may be raised a substantial distance above the surrounding surface of the roller, or they may be depressed below the surrounding cylindrical surface in which case the tape will be magnetized over its entire surface except in areas shaped like the characters to be printed. Both types of delineation of the characters on the character roller are herein referred to as "relief."

The permanent magnet 15 has a length, in the direction of the roller axis, which is at least equal to the widest character delineated on the roller, and it is disposed opposite the characters on the roller. The magnet is very narrow in the circumferential direction so as to cooperate with the roller in defining a circumferentially narrow air gap, and it is spaced a very small distance from the roller so that it cooperates with the cylindrical roller to closely embrace the tape surfaces. Those skilled in the art will appreciate that the magnet and roller 16 are so connected magnetically as to provide a flux path which includes said air gap. Since the flux path will provide minimum reluctance as the raised portions of the roller surface come into proximity to the magnet, the tape, as it moves through the air gap, will be magnetized in patterns corresponding to such raised portions on the roller.

To compensate for the foreshortening of the characters delineated on the roller, the tape is moved endwise through the magnetizing zone at a speed sufficiently greater than the peripheral speed of the roller to attenuate the magnetized areas of the tape relative to the configuration of the circumferentially foreshortened characters delineated on the roller, impressing magnetic patterns upon the tape in the shape of the characters in their normal forms.

The tape and roller are driven in such synchronized motion from a drive shaft 30 which may be connected with an electric motor (not shown) or other suitable power source. Fixed on the drive shaft is a gear 31 that meshes with a driven gear 32 on the character roller shaft and a drive sprocket 34 which is connected by a chain 35 with a driven sprocket 36 fixed on the shaft of tape carrying roller 8. The ratios of the gears 31 and 32 and sprockets 34 and 36 are so selected that the peripheral speed of tape carrying roller 8 is substantially higher than that of the character roller. It will be understood, however, that the ratio of these peripheral speeds is always constant so as to provide a predetermined ratio of attenuation of the magnetic patterns imposed upon the tape, and it will of course be understood that the tape moves lengthwise through the magnetizing zone in the same direction that the periphery of the roller is moving. The tape and the paper web are of course caused to move through the printing zone in the same directions and at the same speeds.

The means for applying finely divided magnetic material shown in the drawing is merely illustrative and consists of a container 40 for holding a supply of iron oxide dust or the like, an endless belt 41 trained around a pair of rollers 42 and adapted to carry iron oxide dust from the container into proximity to the tape, and an agitator 43 by which the dust on the belt is shaken off of the belt to be picked up by the magnetized areas of the tape. The agitator may comprise a rotatably driven eccentric which vibrates the upper stretch of the belt, and both the belt carrying rollers 42 and the agitator 43 may be driven from the same power source by which the tape and the character bearing roller are driven.

From the foregoing description taken together with the accompanying drawings it will be readily apparent that this invention provides a ferromagnetic printing apparatus which is especially suitable for the printing of calendar pads and similar articles wherein a large number of different characters must be imprinted, by reason of the fact that the characters delineated on the character bearing roller may be very substantially foreshortened circumferentially, so that the character bearing roller may be relatively small and compact, even though it may have a large number of characters delineated thereon; and it will also be apparent that the invention provides means for attenuating the patterns of magnetization impressed upon the tape by the characters on the character roller to thus compensate for such circumferential foreshortening and enable the characters to be imprinted in their normal forms.

What is claimed as my invention is:

1. Apparatus of the type wherein an orbitally movable magnetically retentive member capable of localized surface magnetization is passed, in one portion of its orbit, in magnetizing juxtaposition to a magnetic flux producing means and a character roller having characters delineated in relief in magnetic material upon its peripheral portion, to have localized areas of the orbitally movable member magnetized in configurations corresponding to the characters on the roller so that the magnetized areas of the orbitally movable member can convey magnetic particles picked up in another portion of its orbit from a source thereof to paper or the like to be imprinted, which is moved into imprinting relationship to the orbitally movable member in still another portion of its orbit: said apparatus being characterized by the fact that the characters delineated on the peripheral portion of the roller are foreshortened in the circumferential direction of the roller; and further characterized by synchronized means for rotating said roller and for simultaneously moving the orbitally movable member orbitally past the roller, with its surface traveling in the same direction that the periphery of the roller is moving, but at a speed sufficiently greater than the peripheral speed of the roller to cause the configurations of the magnetized areas of the orbitally movable member to be elongated to the normal shape of the characters delineated on the peripheral portion of the roller.

2. Apparatus for imprinting paper or the like by means which includes an orbitally movable magnetically retentive member capable of localized surface magnetization and means for adhering particles of magnetic material to said member in locally magnetized areas thereof, which areas of magnetization have the shape of the characters to be imprinted, said apparatus comprising: a character bearing roller mounted for rotation in one direction on a fixed axis and having characters to be imprinted delineated in relief in magnetic material on its peripheral surface, said characters being circumferentially foreshortened relative to their normal forms; magnetic flux producing means mounted adjacent to the cylindrical surface of said roller and cooperating with the roller in defining a circumferentially short magnetizing zone; means defining a fixed printing zone through which paper to be imprinted may be moved endwise; means for applying particles of magnetic material to an orbitally movable magnetically retentive member in a dusting zone; means constraining an orbitally movable magnetically retentive member capable of localized surface magnetization to move orbitally through the magnetizing zone in the same direction as the adjacent periphery of the roller is moving, thence through the dusting zone to have particles magnetically adhered to magnetized areas of the member, and thence through the printing zone in contact with paper moving endwise therethrough to transfer said particles to the paper; and means synchronizing the rate of orbital movement of the orbitally movable member through the magnetizing zone with the rate of rotation of the roller, and constraining the orbitally movable member to move at a sufficiently higher speed than the peripheral speed of the roller so that the patterns of magnetization imparted to the orbitally movable member from the roller will be attenuated in the direction of motion of said member, to compensate for the foreshortening of the character delineations on the roller, whereby said areas of magnetization will have the normal configuration of the characters.

3. In apparatus for imprinting paper or the like by means which includes an orbitally movable magnetically retentive member capable of localized surface magnetization and means for adhering particles of magnetic material to said member in locally magnetized areas thereof which areas of magnetization have the shapes of characters to be imprinted: a roller having characters to be imprinted delineated in relief in magnetic material on its peripheral portion, with the characters in circumferentially foreshortened form; means mounting the roller for rotation on a fixed axis; means constraining the orbitally movable member to move in a defined orbit, which orbit includes a zone in which the member passes closely adjacent to the roller, substantially tangent thereto; means including a magnet for providing a fixed circumferentially narrow flux path at said zone which flux path is substantially radial to the roller axis and which includes an air gap through which the orbitally movable member extends; and means for synchronizing rotation of the roller and orbital movement of the orbitally movable member to constrain said member to move through said zone in the same direction as the adjacent periphery of the roller, but at a speed sufficiently faster than the peripheral speed of the roller to cause the configurations of the magnetized areas of the orbitally movable member to be elongated to the nomal shape of the characters delineated on the roller.

References Cited in the file of this patent

UNITED STATES PATENTS

| | | |
|---|---|---|
| 908,267 | Jacobson et al. | Dec. 29, 1908 |
| 2,248,522 | Conrad | July 8, 1941 |
| 2,802,049 | Masterson | Aug. 6, 1957 |
| 2,836,147 | McComb | May 27, 1958 |

OTHER REFERENCES

General Electric Review, July 1952, pages 20, 21, 22 and 61.